United States Patent [19]
Juriga

[11] Patent Number: 5,536,556
[45] Date of Patent: * Jul. 16, 1996

[54] INSULATING LAMINATE

[75] Inventor: Duane M. Juriga, Bloomfield Hills, Mich.

[73] Assignee: Indian Head Industries, Inc., Charlotte, N.C.

[ * ] Notice: The portion of the term of this patent subsequent to Nov. 2, 2010, has been disclaimed.

[21] Appl. No.: 86,157

[22] Filed: Jul. 2, 1993

Related U.S. Application Data

[62] Division of Ser. No. 658,336, Feb. 20, 1991, Pat. No. 5,258,585.

[51] Int. Cl.⁶ .............................. B32B 3/10; B32B 3/26; B32B 7/12; E04B 1/82
[52] U.S. Cl. .......................... 428/138; 428/220; 428/288; 428/290; 428/316.6; 428/317.5; 428/317.7; 181/284; 181/286; 181/290; 181/294
[58] Field of Search ..................... 428/131, 137, 428/138, 220, 317.5, 317.7; 181/284, 286, 290, 291, 294

[56]  References Cited

U.S. PATENT DOCUMENTS

| | | | |
|---|---|---|---|
| 3,265,154 | 8/1966 | March | 181/290 |
| 3,439,774 | 4/1969 | Callaway et al. | 428/116 |
| 4,129,672 | 12/1978 | Momura et al. | 428/316.6 |
| 4,241,806 | 12/1980 | Metzger | 181/286 |
| 4,247,586 | 1/1981 | Rochlin | 181/284 |
| 4,257,998 | 3/1981 | Diepenbrock, Jr. et al. | 181/286 |
| 4,263,356 | 4/1981 | Nomura et al. | 428/316.6 |
| 4,313,524 | 2/1982 | Rose | 181/291 |
| 4,418,108 | 11/1983 | Lin | 428/316.6 |
| 4,476,183 | 10/1984 | Holtrop et al. | 428/317.1 |
| 4,695,501 | 9/1987 | Robinson | 428/317.1 |
| 5,258,585 | 11/1993 | Juriga | 181/286 |

Primary Examiner—Terrel Morris
Attorney, Agent, or Firm—Howard & Howard

[57]  ABSTRACT

An insulating laminate, which is particularly suitable for a sound attenuating barrier, such as a contoured vehicle headliner. The disclosed embodiment includes a finish lamina, which may be preferably cloth-like, and a substrate which is preferably structurally stable and self supporting and which may be adapted to absorb sound primarily at predetermined higher frequencies. In one preferred embodiment, a thin flexible film is located between the finish lamina and the substrate which is adapted to absorb sound primarily at relative lower predetermined frequencies. The film may include a pattern of openings or holes designed to absorb sound primarily at predetermined lower frequencies. In the disclosed embodiment, the substrate includes a porous fiber mat, preferably including fibers having a range of thicknesses to improve sound attenuation at higher frequencies, a structural foam lamina and a reinforcing scrim, preferably comprising spunbonded polyester filaments.

10 Claims, 1 Drawing Sheet

U.S. Patent    Jul. 16, 1996    5,536,556
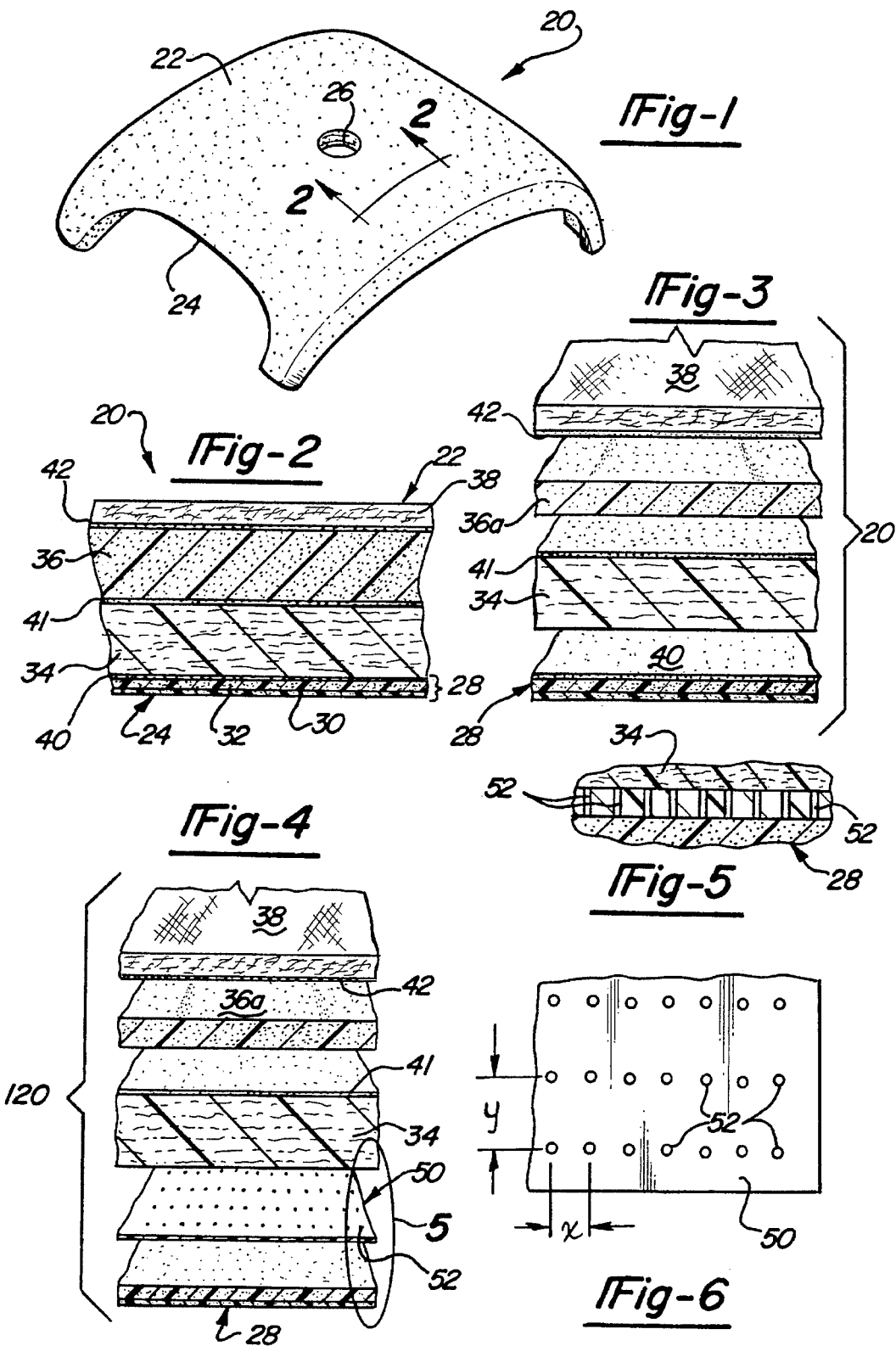

INSULATING LAMINATE

This is a divisional of application Ser. No. 07/658,336 filed on Feb. 20, 1991, now U.S. Pat. No. 5,258,585.

FIELD OF THE INVENTION

This invention relates to insulating laminates, particularly thermoformable laminates and methods of forming same. More particularly, the insulating laminate of this invention provides a thermal and sound barrier, such as may be utilized as a vehicle headliner or structural applications, including office partitions. The laminate includes a finish lamina and a substrate preferably formed of a plurality of laminae forming a structurally stable, self-supporting insulating laminate. In one embodiment, a thin flexible film is located between the finish lamina and the substrate which is adapted to absorb sound particularly at lower frequencies. The film may have a spaced pattern of holes adapted to absorb sound at predetermined frequencies.

BACKGROUND OF THE INVENTION

Various materials have been proposed and utilized as insulating barriers, including thermoformable composites and laminates. In certain applications, such as vehicle headliners, the insulating barrier must be able to withstand temperatures up to about 200° F. for several hours without sagging, absorb sound at a wide range of frequencies and provide an attractive wear and scuff resistant finish surface. As will be understood, these requirements are difficult to achieve and have not been achieved by the prior art.

A typical thermoformable laminate used for automotive headliners is disclosed in U.S. Pat. No. 4,695,501, the disclosure of which is incorporated herein by reference. As shown in FIGS. 3 and 4 of such patent, the laminate includes polymeric foam laminae which are adhesively bonded and enclosed by "fabric" laminae, which are fiber mats impregnated with a thermoformable polymeric resin. In the commercial embodiment, the fiber of the mats has a fineness of about six denier and the foam is a closed cell styrene-maleic anhydride structural foam. The resultant laminate is subject to sagging at elevated temperatures because the nonwoven mat is bonded directly to the automotive roof. Finally, this laminate has poor sound attenuation, particularly at lower frequencies. Thus, the automotive companies have required substantial improvements in structural integrity and sound attenuation.

Automotive headliners have evolved from a fabric layer on fiberboard to composite thermoformable laminates specifically designed or adapted to the requirements of the automotive original equipment manufacturer and the particular vehicle design. The technology of sound attenuation barriers, such as office partitions, has also evolved from a fabric covered foam to improved designs specifically adapted to provide an attractive self-supporting structure, including composite laminates. The need, however, remains for improved thermal and sound barriers which are dimensionally stable and which absorb sound in a broader range of frequencies. The use of a porous foam or fiber mat substrate, as disclosed in several prior art patents, results in sound attenuations at the higher frequencies. Alternatively, the barrier can be designed to absorb sound in the low to mid range of frequencies. The need, however, remains for an improved sound attenuation barrier which is structurally stable, particularly at elevated temperatures, and which is capable of absorbing sound in a broad range of frequencies.

SUMMARY OF THE INVENTION

The preferred embodiments of the insulating laminate of this invention will now be described in relation to an improved vehicle headliner. It will be understood, however, that the improvements in the laminate, including the improvements in structural integrity and sound attenuation, are adaptable for other applications, including office partitions. The improvements in sound attenuation may also be utilized in other applications which do not require a self-supporting or dimensionally stable construction, such as wall coverings. For example, a wall covering can be designed to absorb specific frequencies of sound, such as traffic noises. For ease of description, however, the present invention will now be described in relation to a vehicle headliner embodiment, which is not intended to limit the application of the disclosed inventions.

The acoustical laminate of this invention preferably includes a fabric-like finish lamina and a substrate lamina which supports the finish lamina. In one preferred embodiment of the acoustical laminate, a thin flexible film is located between the finish and substrate laminae. In the preferred embodiment, the substrate is relatively porous to absorb sound in the higher frequencies and the density of the film is chosen to absorb sound at predetermined frequencies in the low to mid ranges. It is thus possible to design a sound attenuation barrier for a broad range of frequencies. It is also possible to design an acoustical laminate to absorb one hundred percent of the sound at predetermined frequencies. The most preferred film is polyethylene having a thickness of less than 5 millimeters. A polyethylene film of 1–3 millimeters is most preferred in many applications because the film is relatively inexpensive and flexible. In fact, the film may also be utilized to bond the finish lamina to the substrate laminae in a heated die.

The acoustical laminate of this invention may be designed to absorb one hundred percent of sound at predetermined frequencies by defining a predetermined pattern of perforations in the film. The number and size of the holes and the percentage of openings relative to the total surface area of the film will determine the frequencies of sound absorbed. Unexpectedly, this improvement in sound attenuation at the lower frequencies is not lost when the film is utilized to bond the finish lamina to the substrate in a heated die press. Further, as described below, the substrate may be designed to absorb a broader range of higher frequencies. Thus, the acoustical laminate of this invention may be designed to absorb sound in a broad range of frequencies. Of equal importance is the fact that the acoustical laminate of this invention may be tailored to solve particular unique noise problems, such as specific sound frequencies generated in a vehicle cab, by modifying the film and substrate, The disclosed embodiments of the insulating laminates of this invention also have improved structural stability and may be self-supporting. In automotive applications, where the insulating laminate may be utilized as an automotive headliner, for example, the improved laminates are structurally stable at elevated temperatures and are self-supporting. The preferred embodiment of the improved laminate includes a cloth-like finish lamina, a fiber mat impregnated with a polymeric resin bonded to the finish lamina, preferably including fibers having a range of fineness, a polymeric foam lamina bonded to the fiber mat, and a fiber reinforcing scrim bonded to the foam lamina. In a most preferred embodiment, the fiber mat is specifically designed to absorb sound at a predetermined range of frequencies and is compatible with the film and finish lamina, such that the acoustical laminate absorbs sound in a broad range of frequencies.

In the preferred embodiment, the fiber mat includes at least 20% by weight of fibers having a fineness of 5–20 denier and at least 20% by weight of fibers having a fineness of 15–30 denier. In the most preferred automotive headliner embodiment of this invention, the fiber mat includes at least 20% by weight of fibers having a fineness of 10–20 denier and at least 20% by weight of fibers having a fineness of 20–30 denier. The fibers are preferably formed of a thermoset resin, such as a thermoset polyester, and the mat is impregnated with a thermoformable polymeric resin, such that the mat can be formed into a contoured shape, as described below.

The foam lamina may be any conventional foam, such as a styrene-maleic anhydride copolymer, but in the preferred embodiment, the foam cells are not fully closed, as described in the above-referenced U.S. patent. The preferred embodiment of the insulating laminate of this invention also includes an improved fiber reinforcing scrim which structurally reinforces the laminate and reduces sag, particularly at elevated temperatures. In the preferred embodiment, the scrim is a spunbonded polymeric sheet, most preferably of substantially continuous filament polyester fibers randomly arranged, highly dispersed and bonded at the filament junctions. In the most preferred embodiment of a contoured laminate, the filaments are crimped and the filaments have a fineness of about 2–10 denier, such that the scrim may be contoured in relatively deep draws without reducing the structural integrity of the scrim.

The method of forming the improved acoustical laminate and structurally stable, self-supporting insulating laminate of this invention thus will depend upon the particular application for the laminate. The method of forming a sound attenuating laminate will include forming a finish sheet and substrate as defined above. In most applications, the substrate sheet will be relatively porous to absorb sound at relatively high frequencies. A flexible, relatively thin film is then formed, preferably including a plurality of spaced openings, such that the film is adapted to absorb sound at mid to lower frequencies. The film is then located between the finish and substrate laminae and the laminate is thermoformed in an oven and molded in a chilled tool. The holes in the film may be formed by piercing the film, preferably in a predetermined pattern, to absorb sound at predetermined frequencies.

The method of forming the preferred structurally stable, self-supporting insulating laminate of this invention, preferably includes forming the preferred laminae, including the finish laminae, the fiber mat and the fiber reinforcing scrim. A foamable material, such as a high density partially closed cell styrene-maleic anhydride copolymer, is preferably formed in situ. The laminate is preheated in an oven, then shuttled quickly into a chilled die, such as a contoured die used to form the configuration of a vehicle headliner, and formed. In the oven, the foam expands to approximately twice its original thickness. The laminate is then quickly shuttled into a chilled die and is formed into the desired configuration. Heat sensitive adhesives may be utilized to bond the lamina. However, in the most preferred embodiment, the thermoformable film, located between the finish lamina and the substrate, will bond the finish lamina to the substrate, as described above.

Other advantages and meritorious features of the insulating laminate of this invention will be more fully understood from the following description of the preferred embodiments, the appended claims and the drawings, a brief description of which follows.

BRIEF DESCRIPTION OF THE DRAWINGS

FIG. 1 is a top plan view of a conventional automotive headliner which may be formed from the acoustical laminate of this invention;

FIG. 2 is a cross-sectional view of the laminated construction of the headliner of FIG. 1, in the direction of view arrows 2—2;

FIG. 3 is an exploded view of the laminate shown in FIG. 2, prior to lamination;

FIG. 4 is an exploded view of another embodiment of the acoustical laminate of this invention similar to FIG. 3;

FIG. 5 is a partial cross-sectional view of the laminate shown in FIG. 4, following lamination; and FIG. 6 is a top view of the perforated film utilized in the laminate shown in FIGS. 4 and 5.

DESCRIPTION OF THE PREFERRED EMBODIMENTS

FIG. 1 is a simplified view of a contoured automotive headliner 20 having a top surface 22, which is secured to the roof of the vehicle, and a bottom finish surface 24, which faces the occupants of the vehicle. The headliner may include openings, such as the central opening 26 which accommodates a central dome light, and deep draws (not shown) to accommodate the configuration of the vehicle roof or for styling purposes. As stated above, the automotive headliner 20 must be able to withstand temperatures up to about 200 degrees Fahrenheit or greater for extended periods of time without sagging and the finish surface 24 should be attractive in appearance and be able to withstand the wear and tear of use over a period of years. More recent requirements by automotive original equipment manufactures include stringent requirements of sound attenuation. If no headliner were included in the vehicle, any sound generated in the vehicle would reverberate off of the metal roof creating an unpleasant atmosphere. The automotive headliner also serves as a dampener for the sheet metal roof, by absorbing sound energy translated through the roof. The automotive headliner absorbs some of the sounds generated in the vehicle compartment; however, more recent requirements by automotive original equipment manufacturers relate to sound attenuation in a broader range of frequencies. Some vehicles may also have problems with noise generated in the vehicle compartment at particular, sometimes unexpected, frequencies. Thus, it would be desirable to be able to tailor the sound absorption of a headliner to accommodate the noise generated in a particular vehicle compartment.

The embodiment of the composite laminate of the headliner 20 shown in FIGS. 2 and 3 is also particularly adapted to be structurally stable at elevated temperatures. As set forth above, the prior art headliners tend to sag at elevated temperatures over time. The disclosed embodiment of the headliner 20 includes a plurality of laminae which, in combination, improve sound attenuation and reduce sag. The composite laminate disclosed in FIGS. 2 and 3 includes a finish lamina 28, a fiber mat 34, a foam laminae 36 and a scrim 38. The finish laminae 28 in the disclosed embodiment includes a face fabric 30, which is bonded to a relatively thin layer of an open cell foam layer 32. As set forth above, the finish surface 24 must be able to withstand the normal wear encountered in a vehicle. In the disclosed embodiment, the face fabric is a nylon knit, providing excellent wear resistance. The open cell foam layer 32 may be polyester, polyether or polyurethane foam providing a soft hand for the laminate. The foam layer 32 may also be eliminated by utilizing, for example, a needle punched olefin fiber. Thus, the finish laminae 28 provides an attractive appearance and feel for the passenger compartment, but is able to withstand the normal wear encountered in a vehicle. This feature may also be important in other applications, as described above.

The fiber mat 34 is specifically designed to absorb sound in a broader range of higher frequencies. Synthetic fibers having a fineness as defined in the prior art were tried. It was discovered, however, that a blend of fibers having different thickness resulted in improved sound attenuation. Blends of fibers having a fineness of 6 and 15 denier were tried and compared with a blend of fibers having a fineness of 15 and 25 denier. Both 50% blends were tried as well as blends favoring finer and thicker fibers. It was determined, for example, that a blend comprising about 75% by weight of fibers having a fineness of 15 denier and about 25% by weight of fibers having a fineness of 25 denier was preferred over a 50% blend of the same fibers or blends of fibers having a fineness of 6 denier and 15 denier. Broadly stated, however, a blend of fibers having different thicknesses was preferred over a conventional fiber mat having fibers of substantially the same fineness. In the preferred embodiment, the fiber mat 34 includes at least 20% by weight fibers having a fineness of 5–20 denier and at least 20% by weight of fibers having a fineness of 15–30 denier. In the more preferred embodiment, the fiber mat comprises at least 20% by weight of fibers having a fineness of greater than 20 denier. In the most preferred embodiment, the fiber mat comprises greater than 40% by weight of fibers having a fineness of about 15 denier and greater than 20% by weight of fibers having a fineness of about 25 denier.

The disclosed embodiment of the fiber mat 34 is comprised of thermoset polyester fibers having a density of about 6–10 ounces per square yard. It was determined that sound attenuation improved as the density was increased until a density of about 10 ounces per square yard was achieved. Densities greater than 10 ounces per square yard showed little or no improvement in sound attenuation. The fiber mat is preferably permeated and saturated with a thermoformable polymeric resin, such that the mat will take a permanent shape during forming under heat and pressure. A suitable bonding agent is polyvinylacetate and chlorinated polymers. In most applications, the fiber mat is also treated with a flame retardant, such as antimony trioxide, which is physically and totally encapsulated within the binder or adhesive. Suitable thermoset polyester fibers in the preferred thicknesses are available, for example, from Fiberbond Corporation of Michigan City, Ind.

The foam lamina 36 is preferably a structural component of the laminate and must be dimensionally stable. The foam lamina also conforms to the desired shape during forming, as described below. A suitable foam is a styrene-maleic anhydride copolymer available from Arco Chemical Company; however, other foam compositions may be utilized. The most preferred composition is only partially closed cell, providing additional sound attenuation and improved dimensional stability. The preferred foam composition has a density of about four to five pounds per cubic foot following expansion which, as set forth below, is about 100 to 120% in the disclosed embodiment.

Finally, the scrim 38 supports the laminate and provides further structural integrity. In the preferred embodiment, the scrim 38 is a spunbonded thermoset polyester fiber mat. In the most preferred embodiment, the mat is formed of continuous filament polyester fibers that are randomly arranged, highly dispersed and bonded at the filament junctions. A suitable polyester mat has a fineness of about 4 denier per filament or a range of 2–10 denier. In the most preferred embodiment, the fibers are crimped to better bridge deep drawn areas as the laminate is formed into a contoured shape, as described below. The scrim may also include filler materials, such as fiberglass filaments, adhesives, etc. Where the scrim includes fiberglass, the content is at least 10%. A suitable scrim is available, for example, from Reemay, Inc. of Old Hickory, Tenn. under the trade name Reemay Spunbonded Polyester.

As described above, the utilization of a scrim 38 at the top surface 22 of the headliner, particularly a spunbonded continuous filament polyester scrim, provides an important advantage for the composite laminate of this invention. The scrim may be bonded to the vehicle roof, providing dimensional stability to the headliner. The headliner may also be removed without substantial damage to the vehicle in a roof bonded headliner application. The headliner may also be secured with mechanical fasteners. The lamina 28, 34, 36 and 38 may be bonded by suitable adhesives, including polyamide and polyethylene adhesives having a low initiation temperature, e.g. 250° to 270° F. The adhesive layers 40, 41 and 42 bond the laminae in face-to-face relation. In the most preferred embodiment, the adhesive is heat actuated, such that the laminate can be simultaneously formed and bonded in a conventional die press.

FIG. 3 illustrates the laminate 20 prior to lamination. In a typical application, the fiber mat 34 is coated with a heat actuated adhesive 41 and an adhesive layer 42 may be applied to the under surface of the scrim 38. The scrim 38, the foamable lamina 36a and the fiber mat 34 are then placed into a hot air recirculated thermoforming oven and heated to a temperature above the actuation temperature of the adhesive. In a conventional application, the oven is heated to a temperature of 290°–300° F. and heated for about two to three minutes. The contoured configuration of the laminate is then formed in a chilled die with the residual heat of the laminate, under pressure, forming the preferred configuration. The fiber mat 34 is simultaneously formed into the contoured shape of the die and the thermoformable resin binder retains the desired shape, as described above. In the disclosed embodiment, the foam lamina 36a expands to approximately twice its original thickness as exposed to heat in the thermoforming oven, as shown in FIG. 2. Finally, the partially formed laminate with the cloth-like finish lamina 28 is received in a tenuring frame (now shown) and formed. The heat from the hot laminate activates the adhesive 40 on the inner surface of the finish lamina 28, forming the preferred composite laminate 20, as shown in FIG. 2.

The composite laminate 20 has important advantages over the prior art, including improved dimensional stability, sound attenuation and reduced sag. The insulating laminate 120 shown in FIGS. 4 and 5 has further improved sound attenuation in a broader range of frequencies, as now described. As will be understood by those skilled in the art, lower frequencies of sound are absorbed better in porous solid barriers. Thus, the porous fiber mat 34 provides a relatively good barrier for sound at higher frequencies, i.e. frequencies above 3,000 Hz. The sound attenuation at these higher frequencies has been improved in the insulating laminates of this invention by utilizing fibers having a range of thicknesses or "fineness" as compared to the above-described prior art, wherein a fiber mat having fibers of substantially uniform thickness were utilized. It is also understood that a permeable solid barrier will better absorb sound at lower frequencies and the prior art includes sound barriers which include a solid permeable barrier which absorbs sound at lower frequencies, but reflect sound at higher frequencies. However, the insulating laminate shown in FIGS. 4 and 5 will absorb sound at both higher frequencies and sound at low to mid range frequencies, as now described.

As shown in FIG. 4, the disclosed embodiment of the laminate 120 includes all of the laminae described above in regard to FIGS. 2 and 3, including the finish lamina 28, the fiber mat 34, the foamable resin lamina 36a and the continuous filament spunbonded scrim 38. However, in the embodiment of the laminate 120 shown in FIG. 4, a relatively thin non-formed flexible film 50 is received between the finish lamina 28 and the fiber mat 34. It has been found that a relatively thin film having the desired density will absorb sound at low to mid ranges, i.e. 125–3000 Hz. Where a solid or imperforate sheet is used, such as a film of polyethylene having a thickness of less than 3 millimeters, the improvement in sound attenuation at low to mid range frequencies is substantially improved, but the sound attenuation of the laminate at higher frequencies is reduced, but not lost. In one experiment, the loss of sound attenuation at frequencies above 3,000 Hz was reduced about 15% compared to sound absorption with the acoustical laminate shown in FIG. 2. The gain in sound attenuation below 3,000 Hz, however, improved 40–60% and therefore favorably compared with commercial acoustical laminates.

It was discovered, however, that it is possible to attain the advantages of the addition of the polyethylene film without sacrificing sound absorption at higher frequencies by perforating the film 50, as shown in FIGS. 4–6. As best shown in FIGS. 5 and 6, a plurality of spaced holes 52 are provided in the film to which preferably extend through the film. These holes 52 may be arranged in a predetermined pattern to absorb sound at predetermined frequencies in the low to mid ranges. The pattern of holes shown in FIG. 6 were specifically designed to absorb sound in the mid range, i.e. 1,500–3,000 Hz. The film used in one test was a polyethylene film having a thickness of 1.5 millimeters. The holes were spaced 0.7 centimeters between holes in each row on the "x" axis, as shown in FIG. 6, and 1.5 centimeters between rows in the "y" axis. Each hole had a diameter of about 3 millimeters and it was calculated that the area of the openings was less than about 15% of the total surface area. The perforations, however, resulted in a very substantial improvement in the sound absorption in the mid range, even compared to an imperforate polyethylene film. For example, the sound absorption at 1,600 Hz using a laminate as shown in FIG. 4 with an imperforate polyethylene sheet was 83%. The sound absorption with the perforated sheet shown in FIGS. 5 and 6 was 100% at 1,600 Hz. Similarly, the sound absorption at 2,000 Hz with a laminate having an imperforate polyethylene sheet was 76%, compared to 100% with the perforated sheet. At frequencies greater than 2,000 Hz, the improvement was reduced; however, the sound absorption with the imperforate sheet at 2,500 Hz was 70%, compared to 88% with the perforated sheet. Thus, a very dramatic improvement in sound attenuation at mid range frequencies was found using a perforated film.

It is therefore possible to design an insulating laminate to absorb sound at predetermined frequencies and tailor a vehicle headliner, for example, to solve noise problems encountered with a vehicle design. These improvements may also be utilized in other applications, including office partitions and even wall coverings for residences. Where the laminate is formed into a contoured shape, the film 50 is preferably thermoformable. It might be expected that the improvement provided by the holes 52 would be lost when the heated laminate is formed in a chilled contoured die. However, it was found that a thermoformable film may even be used as the adhesive for bonding the finish lamina 28 to the fiber mat 34, as shown in FIG. 5, provided the heated lamina does not exceed the melting temperature of the thermoplastic film for a time sufficient to melt the film and close tile holes 52. Thus, the method of forming the laminate 120 is identical to the laminate 20 shown in FIGS. 2 and 3, except that an adhesive 40 is not required between the finish sheet 28 and the fiber mat 34. The thickness and film material will depend upon the particular application. Where the sheet is perforated, a thicker film may be utilized; however, a thickness of greater than about 5 millimeters will provide little advantage and may further reduce sound attenuation at higher frequencies, although a film of 10 millimeters may be used in some applications while retaining the advantages of this invention. The most preferred range of thicknesses for the film is 1–3 millimeters and a polyethylene film having a thickness of 1.5 millimeters has been found to be excellent for automotive headliners. Polyethylene is the most preferred material for the film because a polyethylene film is flexible and thermal formable without a substantial loss of the dimensional stability of the holes 52 and polyethylene is relatively inexpensive. Other materials may, however, prove satisfactory, including metal foils. It will also be understood that a film, particularly a perforated film, may be utilized in other insulating or sound attenuating laminates, particularly where sound absorption at low to mid ranges is desired. The preferred substrate will depend upon the particular application and is not limited to the disclosed substrate. The film 50 is preferably located between tile finish lamina and the substrate, such that the film is not visible. Further, as described above, the spacing between the holes or the "pattern" of the holes will depend upon the frequency of the sound to be absorbed by the barrier. Finally, as described above, the film 50 is preferably designed to be compatible with the substrate wherein the film will absorb sound at predetermined frequencies in the low to mid ranges and the substrate will absorb sound at higher frequencies. In the disclosed embodiment, for example, the fiber mat 34 is preferably a blend of fibers having different thicknesses, such that the fiber mat absorbs sound in a broader range of higher frequencies and the film 50 has a pattern of holes 52 adapted to absorb sound in a lower range of frequencies. An imperforate film may also be preferred, particularly where the film is relatively thin.

As will be understood by those skilled in the art, various modifications may be made to the disclosed embodiments of the insulating laminate of this invention within the purview of the appended claims. For example, various filler materials may be added to the fiber mat 34, including finer and courser fibers and materials adapted to absorb sound at predetermined frequencies. The utilization of a composite finish lamina may be preferred in applications where a film is used between the finish lamina and the substrate, as shown in FIG. 4. However, any finish lamina, including woven and nonwoven cloth or fibrous materials may be preferred in other applications. Preformed foam sheets may be preferred in sound barriers where the barrier is not contoured, permitting the use of a wider range of foam laminae. Finally, the continuous filament spunbonded scrim is preferred in applications where the laminate is bonded to another surface, particularly where the laminate is suspended from the supporting surface, such as an automotive roof. It will be understood, however, that many applications do not have a hostile environment, as found in a vehicle passenger compartment, and therefore a scrim may not be required in such applications. Having described my invention in alternative embodiments, I now claim my invention, as follows.

I claim:

1. A thermoformable acoustical laminate adapted to absorb sound in a range of frequencies, comprising:

a substrate layer comprising a polymeric foam lamina bonded to a lamina of nonwoven polymeric fibers;

a thin, flexible relatively dense non-foamed thermoplastic film thermally fused to the nonwoven lamina of said substrate layer without adhesive; and a finish lamina thermally fused without adhesive to an opposite side of said thermoplastic film.

2. The thermoformable acoustical laminate defined in claim 1, wherein said substrate layer further includes a reinforcing polymeric fiber scrim bonded to said substrate layer by a heat actuated adhesive opposite said finish lamina.

3. The thermoformable acoustical laminate defined in claim 1, wherein said thermoplastic film is a film of polyethylene having a predetermined pattern of spaced openings, whereby said polyethylene film is adapted to absorb sound at predetermined frequencies primarily in the low to mid ranges.

4. The thermoformable acoustical laminate defined in claim 3, wherein said openings through said polyethylene film are generally cylindrical and define less than 20% of the total surface area of said film.

5. The thermoformable acoustical laminate defined in claim 1, wherein said finish lamina comprises a fabric finish layer and a thin open cell polymeric foam layer.

6. A structurally stable, self-supporting insulating acoustical laminate adapted to absorb sound in a range of frequencies, comprising:

a substrate layer comprising a reinforcing polymeric fiber scrim layer, a polymeric foam lamina bonded to said scrim layer and a lamina of nonwoven polymeric fibers bonded to said polymeric foam lamina;

a thin relatively dense non-foamed thermoplastic film having a plurality of spaced openings through said film bonded to said lamina of nonwoven fibers; and a finish lamina bonded to an opposite side of said thermoplastic film.

7. The thermoformable acoustical laminate defined in claim 6, wherein said thermoplastic film is a polyethylene film thermally fused to and formed integrally with said lamina of nonwoven fibers and said finish lamina without adhesive.

8. The thermoformable acoustical laminate defined in claim 6, wherein said lamina of nonwoven polymeric fibers comprises a thermoset polymer fiber matt wherein the fibers are bonded together to form a structurally self-supporting lamina.

9. The thermoformable acoustical laminate defined in claim 6, wherein the scrim layer, foam lamina and fiber lamina in the laminate by a heat sensitive layer.

10. A vehicle laminate, said laminate being formed of a composite structure, including a finish surface and an opposite substrate support surface, adapted to be attached to a vehicle, said composite structure comprising:

a finish lamina, a fiber mat impregnated with a polymeric resin bonded to said finish lamina, said fiber mat including a blend of fibers of different fineness ranging from 5 to 30 denier, a polymeric foam lamina bonded to said fiber mat and a scrim bonded to said foam lamina forming said substrate support surface, said scrim comprising randomly arranged non-woven thermoset polymeric filaments having fineness of about 2 to 10 denier, said filaments bonded at the filament junctions forming a support for said laminate and said substrate support surface.

* * * * *